(12) United States Patent
Zhang et al.

(10) Patent No.: US 10,452,899 B2
(45) Date of Patent: Oct. 22, 2019

(54) UNSUPERVISED DEEP REPRESENTATION LEARNING FOR FINE-GRAINED BODY PART RECOGNITION

(71) Applicant: Siemens Healthcare GmbH, Erlangen (DE)

(72) Inventors: Pengyue Zhang, Stony Brook, NY (US); Yefeng Zheng, Princeton Junction, NJ (US)

(73) Assignee: Siemens Healthcare GmbH, Erlangen (DE)

(*) Notice: Subject to any disclaimer, the term of this patent is extended or adjusted under 35 U.S.C. 154(b) by 77 days.

(21) Appl. No.: 15/689,046

(22) Filed: Aug. 29, 2017

(65) Prior Publication Data

US 2018/0060652 A1 Mar. 1, 2018

Related U.S. Application Data

(60) Provisional application No. 62/381,757, filed on Aug. 31, 2016.

(51) Int. Cl.
*G06K 9/00* (2006.01)
*G06K 9/62* (2006.01)
(Continued)

(52) U.S. Cl.
CPC .......... *G06K 9/00362* (2013.01); *G06K 9/46* (2013.01); *G06K 9/4628* (2013.01); *G06K 9/6257* (2013.01); *G06K 9/6259* (2013.01); *G06K 9/6267* (2013.01); *G06K 9/6271* (2013.01); *G06K 9/6288* (2013.01); *G06K 9/6298* (2013.01); *G06T 7/74* (2017.01); *G06K 2209/05* (2013.01); *G06T 7/60* (2013.01); *G06T 2200/04* (2013.01); *G06T 2207/10072* (2013.01); *G06T 2207/10081* (2013.01); *G06T 2207/10088* (2013.01); *G06T 2207/20081* (2013.01);
(Continued)

(58) Field of Classification Search
None
See application file for complete search history.

(56) References Cited

U.S. PATENT DOCUMENTS 8,326,870 B2 * 12/2012 Rizzolo .................. G06Q 10/06
707/781
10,074,038 B2 * 9/2018 Hsieh ..................... G06T 7/0012
(Continued)

OTHER PUBLICATIONS

Yan et al. entitled, "Bodypart recognition using multi-stage deep learning," Information Processing in Medical Imaging, 2015 (Year: 2015).*

(Continued)

*Primary Examiner* — Andrae S Allison

(57) ABSTRACT

A method and apparatus for deep learning based fine-grained body part recognition in medical imaging data is disclosed. A paired convolutional neural network (P-CNN) for slice ordering is trained based on unlabeled training medical image volumes. A convolutional neural network (CNN) for fine-grained body part recognition is trained by fine-tuning learned weights of the trained P-CNN for slice ordering. The CNN for fine-grained body part recognition is trained to calculate, for an input transversal slice of a medical imaging volume, a normalized height score indicating a normalized height of the input transversal slice in the human body.

19 Claims, 7 Drawing Sheets

(51) Int. Cl.
*G06K 9/46* (2006.01)
*G06T 7/73* (2017.01)
*G06T 7/60* (2017.01)

(52) U.S. Cl.
CPC .............. *G06T 2207/20084* (2013.01); *G06T 2207/30004* (2013.01)

(56) References Cited

U.S. PATENT DOCUMENTS

| | | | | |
|---|---|---|---|---|
| 10,127,659 | B2* | 11/2018 | Hsieh | G06N 3/04 |
| 10,169,873 | B2* | 1/2019 | Gur | G06T 7/0012 |
| 2006/0018524 | A1* | 1/2006 | Suzuki | G06K 9/3233 382/128 |
| 2015/0379422 | A1* | 12/2015 | Chandler | G06N 99/005 706/12 |
| 2016/0171346 | A1* | 6/2016 | Han | G06K 9/66 382/103 |
| 2016/0174902 | A1* | 6/2016 | Georgescu | G06T 7/73 600/408 |
| 2018/0165808 | A1* | 6/2018 | Bagci | G06T 7/0012 |

OTHER PUBLICATIONS

Yan et al, Multi-instance deep learning: Discover discriminative local anatomies for bodypart recognition, IEEE Transactions on Medical Imaging, vol. 35, No. 5, May 2016 (Year: 2016).*
Sun, Wenqing, et al. "Enhancing deep convolutional neural network scheme for breast cancer diagnosis with unlabeled data." Computerized Medical Imaging and Graphics 57 (2017): 4-9. (Year: 2017).*
Doersch, Carl, Abhinav Gupta, and Alexei A. Efros. "Unsupervised visual representation learning by context prediction." Proceedings of the IEEE International Conference on Computer Vision. 2015.
Greenspan, Hayit, Bram van Ginneken, and Ronald M. Summers. "Guest editorial deep learning in medical imaging: Overview and future promise of an exciting new technique." IEEE Transactions on Medical Imaging 35.5 (2016): 1153-1159.
Quality of DICOM header information for image categorization; Guld, M. O. Kohnen, M. Keysers, D. Schubert, H. Wein, B. B.; Bredno, J. Lehmann, T. M.; Quality of DICOM header information for image categorization; International Society for Optical Engineering (Proceedings—SPIE the International Society for Optical Engineering); 1999; 2002, ISSU 4685, pp. 280-287; USA; Proceedings—SPIE the International Society for Optical Engineering; 0361-0748.
Jia, Y., Shelhamer, E., Donahue, J., Karayev, S., Long, J., Girshick, R., . . . & Darrell, T. (Nov. 2014). Caffe: Convolutional architecture for fast feature embedding. In Proceedings of the 22nd ACM international conference on Multimedia (pp. 675-678). ACM.
Krizhevsky et al., "ImageNet classification with deep convolutional neural networks", Advances in neural information processing systems, p. 1097 ff., 2012.
LeCun, Yann, Yoshua Bengio, and Geoffrey Hinton. "Deep learning." Nature 521.7553 (2015): 436-444.
Lecun Yann et al., "Gradient-based learning applied to document recognition", Proceedings of the IEEE, New York, US, vol. 86, No. 11, Nov. 1, 1998, pp. 2278-2323, XP000875095, ISSN: 0018-9219, DOI: 10.1109/5.726791.
Li, Yin, et al. "Unsupervised learning of edges." Proceedings of the IEEE Conference on Computer Vision and Pattern Recognition. 2016.
Mikolov, Tomas, et al. "Distributed representations of words and phrases and their compositionality." Advances in neural information processing systems. 2013.
Mustra, Mario, Kresimir Delac, and Mislav Grgic. "Overview of the DICOM standard." Elmar, 2008. 50th International Symposium. vol. 1. IEEE, 2008.
Roth, Holger R., et al. "Anatomy-specific classification of medical images using deep convolutional nets." Biomedical Imaging (ISBI), 2015 IEEE 12th International Symposium on. IEEE, 2015.
Tajbakhsh, Nima, et al. "Convolutional neural networks for medical image analysis: Full training or fine tuning?." IEEE transactions on medical imaging 35.5 (2016): 1299-1312.
Wang, Xiaolong, and Abhinav Gupta. "Unsupervised learning of visual representations using videos." Proceedings of the IEEE International Conference on Computer Vision. 2015.
Yan, Zhennan, et al. "Multi-instance deep learning: Discover discriminative local anatomies for bodypart recognition." IEEE transactions on medical imaging 35.5 (2016): 1332-1343.

* cited by examiner

UNSUPERVISED DEEP REPRESENTATION LEARNING FOR FINE-GRAINED BODY PART RECOGNITION

This application claims the benefit of U.S. Provisional Application No. 62/381,757, filed Aug. 31, 2016, the disclosure of which is herein incorporated by reference.

BACKGROUND OF THE INVENTION

The present invention relates to body part recognition in medical images, and more particularly, to deep learning based fine-grained body part recognition in medical images.

Deep learning techniques have received much attention in recent years. With computing power increasing due to modern graphics processing units (GPUs) and large labeled datasets, such as ImageNet and PASCAL VOC, deep learning architectures such as convolutional neural networks (CNNs) have been applied to many computer vision problems, such as image categorization, object detection, and image quality assessment. Recently, there have been many efforts to apply deep learning techniques to medical imaging tasks.

Although deep learning architectures, such as CNNs, have achieved impressive progress in many computer vision problems, the use of deep learning architectures becomes much more complicated in the medical imaging domain. For CNNs, a large labeled image set is typically required for adequate network training. However, collecting large-scale medical and annotations requires much expense, expertise, and time, which makes training a CNN from scratch unaffordable. One possible solution is to learn the network in an unsupervised manner. However, existing unsupervised learning methods do not perform well on learning meaningful representations for discrimination tasks. One way that has been proposed to alleviate the lack of annotated training samples is to pre-train a network on large-scale natural image datasets (e.g., ImageNet) and then fine-tune the network parameters for specific tasks. This kind of knowledge transfer is not only feasible, but in many cases is superior to training a CNN from scratch in terms of accuracy. Nevertheless, though most natural images and medical images share many low-level features, they still differ considerably in object-level structures. Thus, transfer learning from natural image data to medical applications may bring substantial bias which can possibly damage the experimental performance of the CNN.

CNN-based methods have been developed for body part recognition in medical imaging data. However, previous CNN-based body part recognition techniques remain at a coarse level, while real-world applications require more precise body part recognition.

BRIEF SUMMARY OF THE INVENTION

The present invention provides a method and system for deep learning based fine-grained body part recognition in medical imaging data. Embodiments of the present invention pre-train a paired-CNN (P-CNN) to learn a deep representation for an auxiliary task of 2D slice ordering in an unsupervised/self-supervised manner based on unlabeled training data, and then transfer and fine-tune the pre-trained P-CNN to train a CNN for fine-grained body part recognition. Embodiments of the present invention utilize a normalized body height model to perform fine-grained body part recognition at a continuous level.

In an embodiment of the present invention, a paired convolutional neural network (P-CNN) for slice ordering is trained based on unlabeled training medical image volumes. A convolutional neural network (CNN) for fine-grained body part recognition is trained by fine-tuning learned weights of the trained P-CNN for slice ordering.

In an embodiment of the present invention, the CNN for fine-grained body part recognition is trained to calculate, for an input transversal slice of a medical imaging volume, a normalized height score indicating a normalized height of the input transversal slice in the human body.

These and other advantages of the invention will be apparent to those of ordinary skill in the art by reference to the following detailed description and the accompanying drawings.

DETAILED DESCRIPTION

Figure 1:
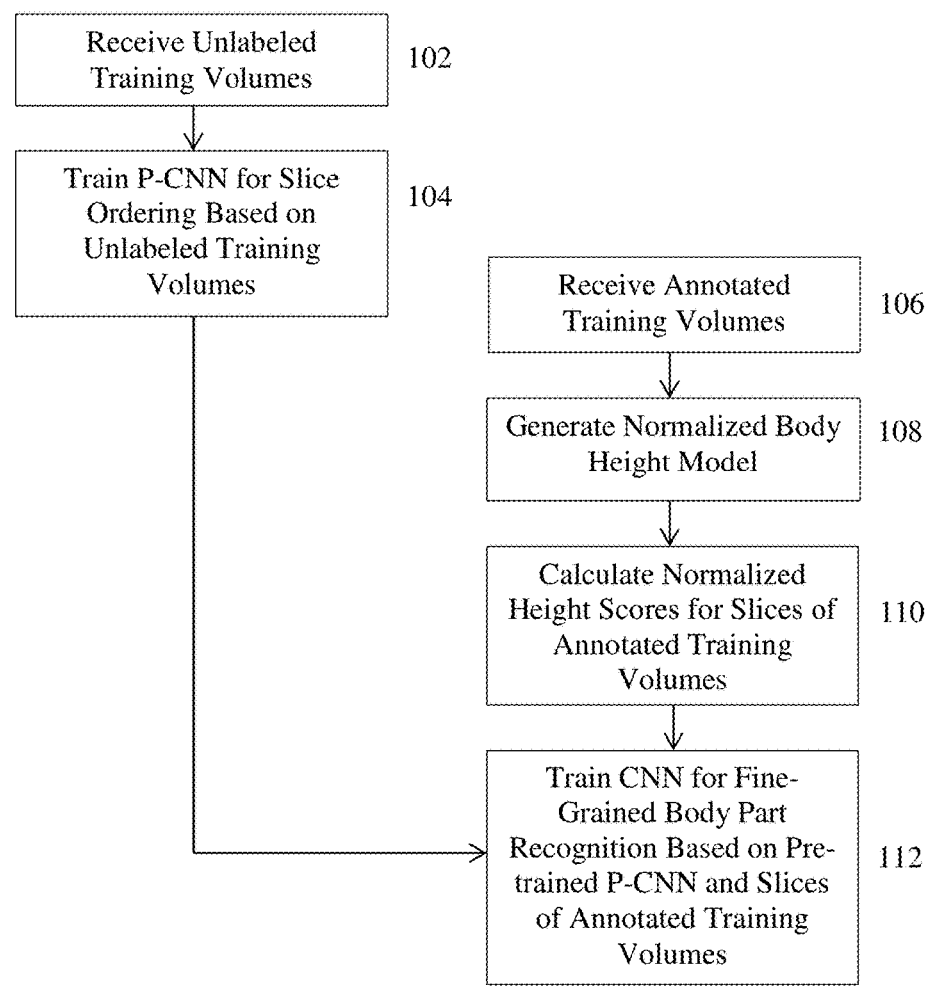
FIG. 1 illustrates a method for training a convolutional neural network (CNN) for fine-grained body part recognition according to an embodiment of the present invention.

The present invention relates to a method and system for deep learning based fine-grained body part recognition in medical imaging data. Embodiments of the present invention are described herein to give a visual understanding of the deep learning based fine-grained body part recognition method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

In order to train deep learning architectures such as convolutional neural networks (CNNs) for medical imaging tasks, a large labeled set of images is typically required. However, collecting large-scale medical data and annotations requires much expense, expertise, and time, which makes training such a network from scratch unaffordable. One possible solution is to learn the network in an unsupervised manner. However, existing unsupervised learning methods do not perform well on learning meaningful representations for discrimination tasks. One way that has been proposed to alleviate the lack of annotated training samples is to pre-train a network on large-scale natural image datasets (e.g., ImageNet) and then fine-tune the network parameters for specific tasks. This kind of knowledge transfer is not only feasible, but in many cases is superior to training a CNN from scratch in terms of accuracy. Nevertheless, though most natural images and medical images share many low-level features, they still differ considerably in object-level structures. Thus, transfer learning from natural image data to medical applications may bring substantial bias which can possibly damage the experimental performance of the CNN.

Embodiments of the present invention provide improvements to existing techniques for training deep learning architectures for body part recognition in medical images. Embodiments of the present invention provide a method in which an initial deep representation for slice based body part recognition is learned in an unsupervised manner and then used as a basis for transfer learning and fine tuning to train a final CNN for fine-grained body part recognition. The difficulty in transfer learning caused by the gap between natural and medical images adds to the significance of the effective unsupervised learning solution described herein. For unsupervised learning. A typical 3D medical imaging volume (e.g., computed tomography (CT) volume, magnetic resonance imaging (MRI) volume, etc.) contains rich context information. According to an advantageous embodiment of the present invention, with an unlabeled dataset of 3D medical imaging volumes, the transversal slices of the volumes can be easily indexed and the order of the slices can be acquired for free (without manual annotation) as natural indicators of spatial positions. This spatial context information is used to transform the unsupervised learning problem to a self-supervised learning problem, without the need for manual labeling or annotation of a large set of training data.

CNN-based methods have been developed for body part recognition in medical imaging data. However, previous CNN-based body part recognition techniques remain at a coarse level, while real-world applications require more precise body part recognition. For example, in previous CNN-based body part recognition techniques, the human body is classified into five or twelve discrete parts. However, the human body is a coherent and continuous whole instead of several unrelated object classes. Two close slices from two different sides of a region border may have more similar shapes and structures than two far apart slices from the same body region, which makes it unpractical to divide the body into distinct regions. Practical application may require body part recognition at a finer level body several exclusive body regions. Embodiments of the present invention utilize a normalized body height model to perform fine-grained body part recognition at a continuous level, and thus provide improvements to previous deep learning based body part recognition methods.

In an advantageous embodiment of the present invention, an end-to-end convolutional network called a paired-CNN (P-CNN) is trained based on unlabeled training data to predict the spatial order of two input slices of a 3D medical imaging volume. The trained P-CNN is then used as a knowledge source for training a CNN for fine-grained body part recognition. The idea behind the use of the pre-trained slice ordering model is that correctly recognizing the relative position of slices requires good visual understanding of the images. The first several convolutional layers of a CNN acts as filters which automatically learn common low-level features such as edges, corners, and texture. Therefore, weights from the pre-trained P-CNN can be used to provide a better initialization for training a CNN for body part recognition than randomized initialization. Furthermore, as compared to a network pre-trained on natural images such as ImageNet, the P-CNN provides a better knowledge source for medical imaging applications, thus closing the gap between the pre-trained network and target medical imaging analysis tasks. Embodiments of the present invention, in which a P-CNN is pre-trained based on unlabeled training data and then fine-tuned to train a CNN for fine-grained body part recognition, provide a boost for fine-grained body part recognition in terms of both resolution and accuracy, as compared to other body part recognition techniques.

A CNN includes a series of cascaded layers with different functionality: convolutional layers are used to computer local correlations in patches; non-linear function layers embed non-linearity into a high dimensional space; pooling layers bring together the local response to produce invariant features; loss layers output results as well as guide the back-propagation process. A complicated non-linear model can be implemented by simply combining and stacking network layers. In particular, given a set of images $X=\{X_1, X_2, \ldots, X_N\}$ in a classification problem, the loss function of the CNN can be formulated as:

$$L = -\frac{1}{N}\sum_{i=1}^{N} \log(P(y_i \mid X_i, W)) \qquad (1)$$

where $P(y_i|X_i,W)$ denotes the probability of correctly classifying $X_i$ as class $y_i$ with network weights W. The CNN is trained by minimizing the gradient of the loss function for the training data with respect to the weights W sing the back-propagation algorithm and stochastic descent.

FIG. 1 illustrates a method for training a CNN for fine-grained body part recognition according to an embodiment of the present invention. The method of FIG. 1 performs the training in two stages. The first stage (steps 102-104) is an unsupervised/self-supervised pre-training stage in which a P-CNN for slice ordering is trained based on unlabeled training data. In the second stage (steps 106-112) the pre-trained P-CNN is used as a basis for transfer learning and fine-tuning to train a CNN for fine-grained body part recognition.

At step 102, in the pre-training stage, unlabeled training volumes are received. The unlabeled training volumes are 3D medical imaging volumes. For example, the unlabeled training volumes may be 3D CT volumes, 3D MRI volumes, or 3D volumes acquired using any other medical imaging modality. The unlabeled 3D medical imaging volumes can be raw medical imaging volumes without any manual annotation. The unlabeled training volumes can be received by loading the training volumes from a database of medical imaging volumes.

At step 104, a P-CNN for slice ordering is trained based on the unlabeled training volumes. Instead of directly training a CNN for body part recognition, the method of FIG. 1 pre-trains a network for the auxiliary problem of slice ordering. With a complete 3D medical imaging volume, a set of transversal slices as well as their order can be easily obtained without manual annotation. Accordingly, a set of transversal slices and an order of the transversal slices are acquired for each of the 3D training volumes. Although individual human bodies are unique in many details, their scanned CT or MR images share variation trends from head to toe. The order of the transversal slices can be used as a free source of supervision and a CNN can be trained to learn an intrinsic relationship among the slices. Since this pre-training does not involve any kind of human annotation, there is more flexibility when choosing the size of the training set. Using more training data only means more computational time, but does not involve any extra human effort for annotating or labeling the training data.

Figure 2:
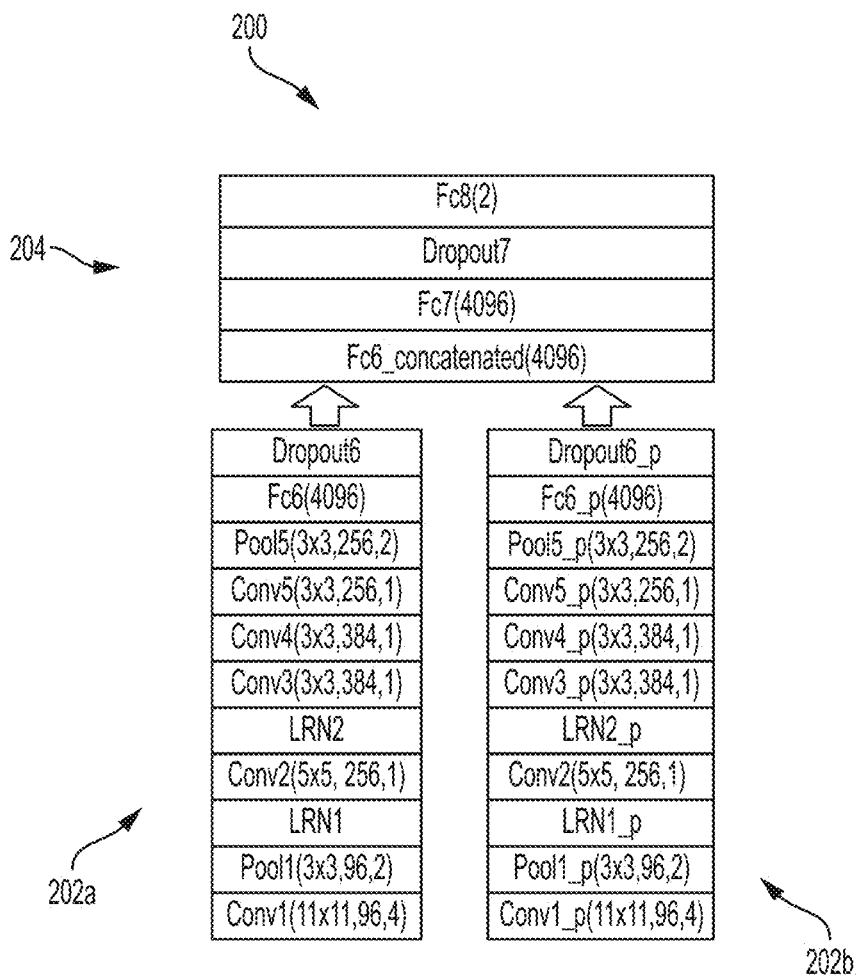
FIG. 2 illustrates an exemplary network architecture of a paired CNN (P-CNN) for slice ordering according to an embodiment of the present invention.

According to an advantageous embodiment, a paired convolutional neural network (P-CNN) is trained to learn a deep representation for slice ordering. FIG. 2 illustrates an exemplary network architecture of a P-CNN 200 for slice ordering according to an embodiment of the present invention. The P-CNN 200 inputs two transversal slices of a 3D medical imaging volume and calculates a binary classification result that predicts which of the two slices above the other slice in the 3D medical imaging volume. As illustrated in FIG. 2, the network architecture of the P-CNN 200 includes two stages: two sub-networks 202a and 202b for the first six layers; and the final global layers 204. First and second slices of a medical imaging volume are input to the two sub-networks 202a and 202b, respectively. In an advantageous implementation, the two sub-networks 202a and 202b are forced to share weights (i.e., the weights of each layer are identical in the two sub-networks 202a and 202b), leading to 50% fewer parameters to be learned in the first six layers. In FIG. 2, "cony" refers to a convolutional layer, "pool" refers to a pooling layer, "LRN" refers to a local response normalization layer, "fc" refers to a fully connected layer, and "dropout" refers to a dropout layer. The kernel size, output number, and stride are listed in parentheses after the layer names in FIG. 2. In the P-CNN 200 of FIG. 2, each cony and fc layer except fc8 is followed by a rectified linear unit (ReLU) layer. In FIG. 2, layers of the second sub-network 202b are identified with the subscript_p. As the architecture of the first and second sub-networks 202a and 202b are identical, their architecture is described together herein and this subscript is omitted for brevity.

As shown in FIG. 2, in the sub-networks 202a and 202b, the first layer includes a convolutional layer (conv1) followed by a ReLU layer, a pooling layer (pool1), and an LRN layer (LRN1). The second layer includes a convolutional layer (conv2) followed by a ReLU layer, a pooling layer (pool2), and an LRN layer (LRN2). The third layer includes a convolutional layer (conv3) followed by a ReLU layer. The fourth layer includes a convolutional layer (conv4) followed by a ReLU layer. The fifth layer includes a convolutional layer (conv5) followed by a ReLU layer and a pooling layer (pool5). The six layer includes a fully connected layer (fc6) followed by a ReLU layer and a dropout layer (dropout6). In the final global layers 204, the output of the two fc6's from the two sub-networks 202a and 202b are concatenated (fc6_concatenated) and fed to two fully connected layers fc7 and fc8. Fc7 is followed by a ReLU layer and a dropout layer (dropout7). In an exemplary implementation dropout layers with a ratio of 0.5 are used for dropout6 and dropout7 to prevent overfitting. In fc8, a final softmax loss layer is used for the binary classification.

In order to train the P-CNN 200, training samples are generated from the training volumes by randomly sampling transversal slice pairs from the training volumes. Both slices in a given slice pair are randomly sampled from the same training volume. The two slices in each slice pair are fed to the two sub-networks 202a and 202b, respectively. The global final layers 204 of the P-CNN 200 fuse the outputs of the two sub-networks 202a and 202b and compute the probabilities for both possible outcomes (i.e., the first slice is above the second slice or the second slice is above the first slice in the training volume). The P-CNN 200 predicts the classification result for each slice pair as the class with the higher probability. The P-CNN 200 is trained using back-propagation and stochastic gradient descent to learn weights that minimize the loss function between the slice order classification results predicted by the P-CNN for the slice pairs and the actual slice order of the slice pairs over the set of training samples. To solve this binary classification problem, the P-CNN must provide good visual understanding of objects and structures. Thus, the trained P-CNN can serve as a universal low-level feature learner and can be applied to body part recognition with fine-tuning in the second stage (steps 106-112) of the method of FIG. 1.

Returning to FIG. 1, in the transfer learning and fine tuning stage (steps 106-112), the pre-trained P-CNN trained in step 104 is used as a basis for transfer learning and fine-tuning to train a CNN for fine-grained body part recognition. This results in a trained CNN that can perform transversal slice-based body part recognition for newly input transversal slices of a medical imaging volume. Transversal slice-based body part recognition is an important pre-processing step which can help computer aided medical image based detection and diagnosis in many ways. First, precisely recognized body parts can serve as an ideal initialization for further analysis, such as detection, segmentation, and classification. Second, by automatically labeling body part slices, organ/structure-based image retrieval can be easily implemented. Moreover, with fast body part recognition speed, automated body part recognition can be integrated into current medical imaging techniques, such as CT and MRI, to enable real-time planning and diagnosis.

At step 106, annotated training volumes are received. The annotated training volumes are 3D medical imaging volumes with annotated locations for a set of anatomical landmarks. The annotated training volumes may be 3D CT volumes, 3D MRI volumes, or 3D volumes acquired using any other medical imaging modality. The annotated training volumes may be annotated by an expert manually annotating locations of a particular set of anatomical landmarks. Alternatively, the annotated training volumes may be annotated by using an automated or semi-automated landmark detection algorithm to detect the locations of the set of anatomical landmarks in the medical imaging volumes. The annotated training volumes can be received by loading the annotated training volumes. Alternatively the annotated training volumes can be received by loading or acquiring unlabeled medical imaging volumes and then receiving annotations of the landmark locations via user input or from a landmark detection algorithm. In an advantageous embodiment, the set of landmarks annotated in the annotated training volumes may include the head top, neck, lung top, spine, knee, and foot. While it is advantageous for the set of landmarks to include anatomical landmarks over an entire length of the human body, it is to be understood that the present invention is not limited to this specific set of landmarks and other landmarks may be used as well. Since the annotated training volumes are used for transfer learning and fine-tuning the already trained P-CNN weights, the set of annotated training volumes can be much smaller than the set of unlabeled training volumes used to train the P-CNN.

At step 108, a normalized body height model is generated. The normalized body height model is generated based on the annotated landmark locations in at least a subset of the training volumes. Previous body part recognition methods perform body part recognition at a coarse level by classifying a slice into one of a few distinct region classes. According to an advantageous embodiment of the present invention, body part recognition can be modeled as a regression problem instead in order to perform slice-based body part recognition at a much finer recognition resolution. The aim of the regression problem is to predict, for a given transversal slice from any part of the body, a real-number score in the range [0,1] that indicates the normalized height of that slice in the body.

Figure 3:
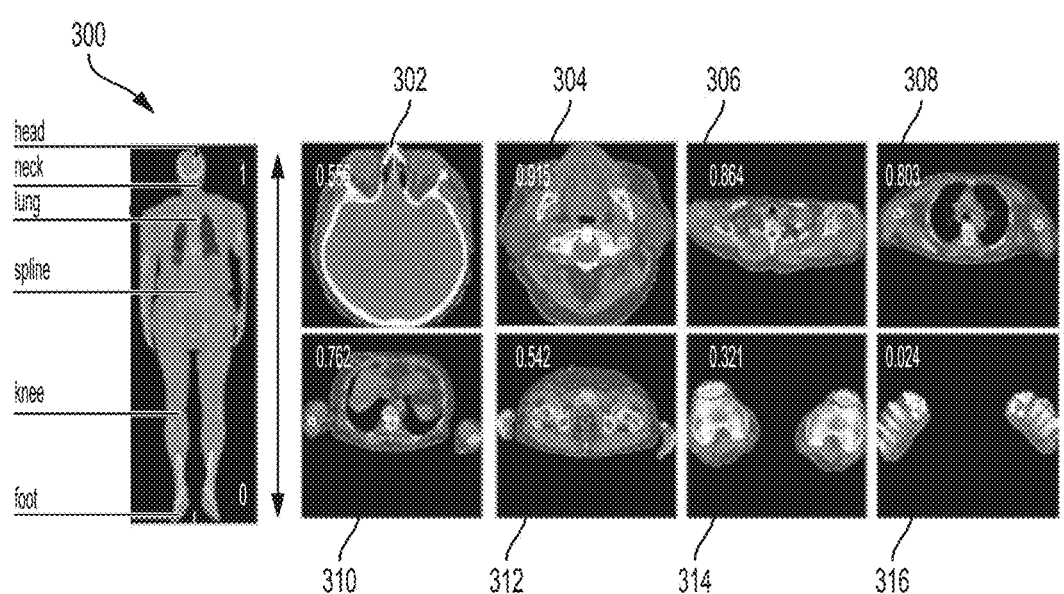
FIG. 3 illustrates a normalized body height model according to an embodiment of the present invention.

The annotated locations of a predetermined set of anatomical landmarks in a number of training volumes are used to generate a normalized body height model. In an exemplary implementation, a set of size anatomical landmarks including the head top, neck, lung top, spine, knee, and foot are used to generate the normalized body height model. FIG. 3 illustrates a normalized body height model according to an embodiment of the present invention. As shown in FIG. 3, image 300 shows a normalized body height model for the human body that normalizes the heights of body parts between 0 and 1. In the normalized body height model 300, height 0 corresponds to the bottom point of the foot and height 1 corresponds to the top of the head. The normalized body height model 300 also includes average normalized heights for the neck, lung top, spine, and knee landmarks generated based on the annotated landmark locations in a number of training volumes. For each training volume in a subset of the annotated training volumes, the height of the foot landmark is considered to be 0, the height of the head top landmark is considered to be 1, and the normalized height values for the neck, lung top, spine, and knee landmarks are each calculated based on the relative height of each landmark between the foot and head top landmarks in that training volume. For each of the neck, lung top, spine, and knee landmarks, the average of the normalized height values in all of the training volumes in the subset is calculated as used to define the normalized height values for those landmarks in the normalized body height model 300.

Returning to FIG. 1, at step 110, normalized height scores are calculated for transversal slices of the annotated training volumes. The normalized height scores for transversal slices for a given training volume based on the annotated positions of the landmarks using linear interpolation. In particular, each landmark in a given training volume is the assigned the corresponding normalized height value for that landmark in the normalized body height model. Linear interpolation is performed the landmarks in order to calculate normalized heights of the transversal slices between the landmarks. For example, the head top and foot landmarks in a given volume are assigned normalized height values of 1 and 0, respectively, and the neck, lung top, spine, and knee landmarks are assigned the corresponding average normalized height values for those landmarks in the normalized body height model. Linear interpolation is then performed between the foot landmark and the knee landmark normalized height values, between the knee landmark and spine landmark normalized height values, between the spine landmark and lung top landmark normalized height values, between the lung top landmark and neck landmark normalized height values, and between the neck landmark and head top landmark normalized height values, in order to calculate the normalized height scores for the transversal slices of the training volume. As shown in FIG. 3, images 302, 304, 306, 308, 310, 312, 314, and 316 show transversal slices from a full body CT volume and their normalized height scores. In particular, the scores in the upper left corner of the slices 302, 304, 306, 308, 310, 312, 314, and 316 indicate their normalized body heights in the CT volume.

Returning to FIG. 1, at step 112, a CNN for fine-grained body part recognition is trained based on the pre-trained P-CNN and the slices of the annotated training volumes. The CNN for fine-grained body part recognition inputs a transversal slice of a medical imaging volume and calculates the normalized height value for that slice in the medical imaging volume. According to an advantageous embodiment, the learned features of the P-CNN for slice ordering can be successfully applied for fine-grained body part recognition for whole body images with minor fine-tuning.

Figure 4:
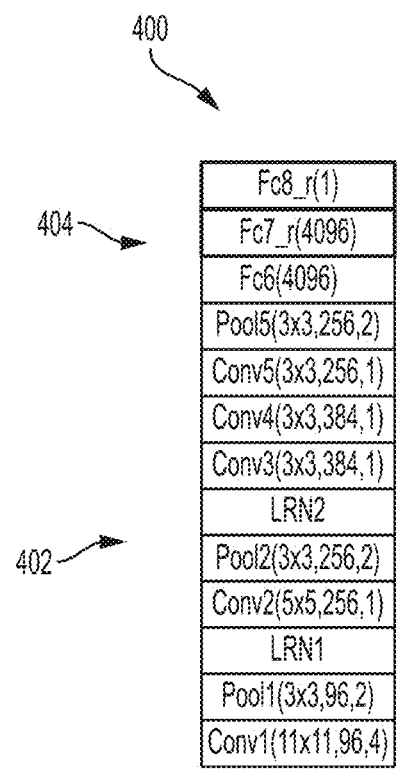
FIG. 4 illustrates an exemplary network architecture of a CNN for fine-grained body part recognition according to an embodiment of the present invention.

FIG. 4 illustrates an exemplary network architecture of a CNN 400 for fine-grained body part recognition according to an embodiment of the present invention. As shown in FIG. 4, the architecture of the first six layers 402 of the CNN 400 to the architecture of each of the sub-networks (202a and 202b in FIG. 2) of the pre-trained P-CNN. The first six layers 402 of the CNN 400 are initialized by copying a subnetwork from the pre-trained P-CNN. As architecture and weights of the two sub-networks (202a and 202b) of the trained P-CNN are identical, it does not matter which of the sub-networks is copied. The learned weights of the sub-networks of the trained P-CNN are used as the initial values for the weights of the first six layers 402 of the CNN 400 for fine-grained body part recognition. The final layers 404 of the CNN 400 for fine-grained body part recognition include two fully connected layers (fc7_r and fc8_r) that perform the regression based on the features extracted in the first size layers 402 to calculate a normalized height value for an input transversal slice. These two fully connected layers of the CNN 400 are trained with randomly initialized weights. For example, the initial values of the weights in the final layers 404 can be randomly initialized from a Gaussian distribution with zero mean and small variation. A Euclidean loss layer is used instead of the softmax loss layer as the final layer of the CNN 400. Hence, the loss function for the CNN 400 becomes:

$$L = \frac{1}{2N} \sum_{i=1}^{N} \|\hat{y}_n - y_n\|_2^2 \qquad (2)$$

where N is the number of training samples, and $\hat{y}_n$ and $y_n$ are the prediction score calculated by the CNN 400 and the ground truth score (i.e., the normalized height score calculated in step 110), respectively. In order to train the CNN 400, starting with weights of the first six layers 402 initialized using the learned weights from the pre-trained P-CNN and weights of the final fully connected regression layers 404 randomly initialized, a deep fine-tuning strategy is used to learn final weights of the CNN 400 that minimize the loss function between the predicted normalized height scores calculated by CNN 400 and the ground truth normalized height scores (calculated in step 110) over the set of training samples (i.e., the transversal slices of the annotated training volumes). In an advantageous embodiment, the deep fine-tuning strategy fine-tunes (adjusts) the weights of all of the layers of the CNN 400, but utilizes a reduced learning rate for the first six layers 402 that were initialized using the weights of the pre-trained P-CNN. In an exemplary implementation, the weights of all of the layers of the CNN 400 are fine-tuned, but with a 1/10 learning rate on the first six layers 402. The learning rates are set to preserve the power of the pre-trained network while boosting learning speed for the following fully connected layers 404.

Once the CNN for fine-grained body part recognition is trained in step 112, the trained CNN can be stored, for example on a memory or storage of a computer system, a non-transitory computer readable medium, and/or on a remote cloud-based computer system. The trained CNN can then be used to perform fine-grained slice-based body part recognition for newly input slices of medical imaging volumes.

Figure 5:
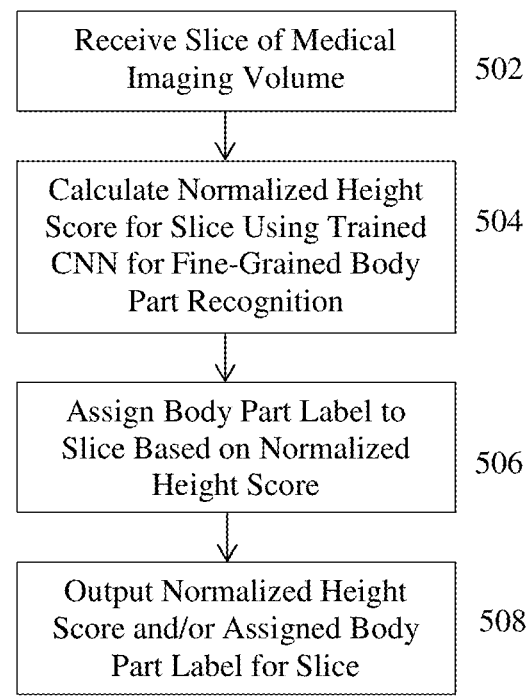
FIG. 5 illustrates a method of fine-grained body part recognition in medical imaging data according to an embodiment of the present invention.

FIG. 5 illustrates a method of fine-grained body part recognition in medical imaging data according to an embodiment of the present invention. The method of FIG. 5 uses a trained CNN, such as a CNN trained using the method of FIG. 1, to perform fine-grained slice-based body part recognition for one or more slices of medical imaging volume.

At step 502, a transversal slice of a medical imaging volume is received. The transversal slice can be a transversal slice of a CT volume, an MRI volume, or a volume acquired using any other type of medical imaging modality. The transversal slice of the medical imaging volume can be received directly from a medical imaging acquisition device, such as a CT scanner, MRI scanner, etc. In this case, the method of FIG. 5 may be performed in real-time as one or more slices are acquired in order to provide real-time slice-based body part recognition. Alternatively, the transversal slice of the medical imaging volume can be received by loading the slice from a memory or storage of a computer system or by receiving the slice via an electronic transmission from a remote computer system.

At step 504, the normalized height score for the slice is calculated using a trained CNN for fine-grained body part recognition. The trained CNN inputs the transversal slice and processes using the learned weights of the various layers of the trained CNN to perform a regression to calculate the normalized height score for the slice. As described above, the normalized height score is a real number in the range [0,1] that provides an indication of the normalized height of the slice in the human body. In an exemplary embodiment, the trained CNN has the architecture shown in FIG. 4 and described above. In an advantageous embodiment, trained CNN is trained using transfer learning and fine-tuning of a pre-trained P-CNN for slice ordering, as describe above in the method of FIG. 1. In other possible embodiments, the trained CNN may alternatively be trained from scratch using randomly initiated weights based on annotated training data or may be trained using transfer learning based on a pre-trained network trained using natural images (e.g., an AlexNet trained on ImageNet images).

At step 506, a body part label is assigned to the transversal slice based on the normalized height score. The normalized height score for the slice provides a precise normalized height of the slice in the human body and therefore can be associated with a specific body part label. The body part label for the slice can be determined by comparison of the normalized height score to a learned normalized body height model that identifies which body parts correspond to which normalized height values. Since the normalized height for slices are determined over a continuous range of values, body part labels can be assigned to slices with a much finer recognition resolution than in previous methods which recognized only coarse body regions. For example, slices can be assigned body part labels corresponding to fine-grained regions of different organs or other anatomical structures (e.g., upper lung, lower lung, etc.).

At step 508, the normalized height score for the slice and/or the assigned body part label for the slice are output. The normalized height score and the body part label for the slice can be output by displaying the normalized height score and the body part label on a display device of a computer system. In a possible implementation, a visualization of the slice can be displayed on a display device and the normalized height score and/or the body part label can be overlaid on the visualization of the slice displayed on the display device. In another possible implementation, the normalized height score and/or the body part label can be displayed on the display device in a separate window of a user interface from the visualization of the slice or on can be displayed on a separate display device from the visualization of the slice. The normalized height score and the assigned body part label can also be stored and used as a basis for identifying the slice in order to implement organ/structure based image retrieval.

In a possible embodiment, the method of FIG. 5 can be used to perform fine-grained body part recognition for all or multiple transversal slices of a medical imaging volume. In this case, a respective normalized height score is calculated for each of the input slices. In a possible implementation, the normalized height scores calculated for all or multiple slices of a medical imaging volume can be used to automatically determine a scan range of the medical imaging volume. In addition, when the normalized height values are calculated for multiple slices in a medical imaging volume, linear regression or other filtering techniques can be applied to remove outlier normalized height values from slices in the volume and replace the outlier normalized height values with expected values determined from the normalized height values of the other slices in the volume.

Exemplary implementations used by the present inventors to test and validate the above described methods are described herein. For slice ordering, a paired convolutional neural network (P-CNN) is trained to learn features from two input slices and predict the relative spatial position of the slices. The slice pair is randomly sampled from the same volume to eliminate the effect of body shape variation between different people. With a large set of training samples covering every part of the human body, the order of slices can be predicted no matter which part the body the slices are from. Large variations in shape across slices requires a good visual understanding of images, which makes the task challenging. In an exemplary implementation, a set of 370 CT volumes containing either full body or partial body was used for pre-training the P-CNN. 2D transversal slices are extracted from the 3D volumes and resized to 256×256 pixels. Since the pre-trained AlexNet uses color images as input, the grayscale CT slices can also be transformed to color by duplicating the grayscale image in three channels. Table removal is applied to each image to eliminate noise and non-body structures. Each pair of slices is randomly sampled from the same volume and labeled automatically with a binary pair label. Mirror images are also included for data augmentation. The mean is subtracted from all images and training pairs are shuffled. Overall 83,000 pairs of slices were used for training and 32,400 pairs of slices were used for testing. Using the trained P-CNN, a prediction accuracy of 90% was achieved on the test set.

Figure 6:
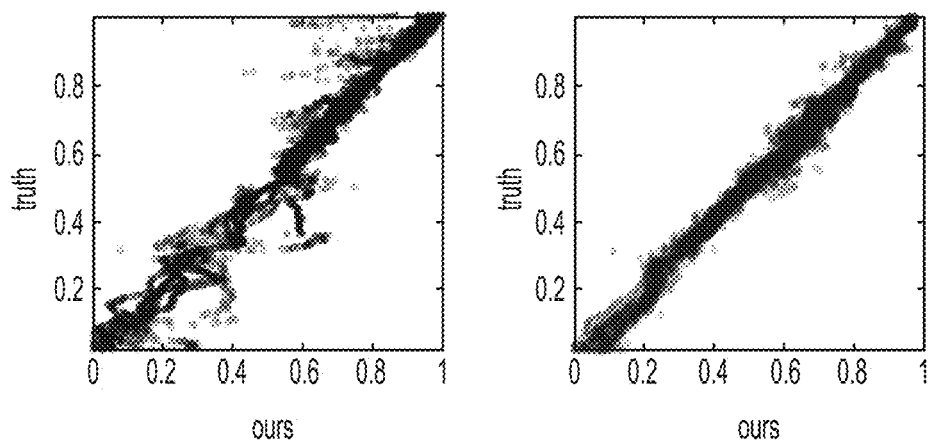
FIG. 6 illustrates exemplary test results for body part recognition by a CNN trained by fine-tuning a pre-trained P-CNN.

The above-described fine-grained body part recognition method was validated on two datasets of CT and MRI volumes. The results of body part recognition using the following different methods/settings were compared: training from scratch (using randomly initiated weights), pre-trained P-CNN with fine-tuning (the method of FIG. 1), and pre-trained AlexNet on ImageNet images with fine-tuning. The same pre-processing is performed to match the pre-training task. Hyperparameters are set as follows: momentum $\mu=0.9$; weight decay $\omega=0.0005$; base learning rate a is approximately set as one half the highest converging learning rate. Overall 102 CT volumes (18700 slices) were used to train/fine-tune the network and 100 CT volumes (19800 slices) were used as a test set. The CT data used for body part recognition were completely different than those used for pre-training. For MRI images, 50 volumes (7140 slices) were used for training and 50 volumes (7245 slices) were used for testing. FIG. 6 illustrates exemplary test results for body part recognition by a CNN trained by fine-tuning a pre-trained P-CNN. As illustrated in FIG. 6, image 600 shows a scatter plot of test results for the CT images and image 602 shows a scatter plot of test results for the MR images. Each of the scatter plots 600 and 602 shows a plot of the predicted results (x-axis) versus the ground truth results (y-axis). Each of the scatter plots 600 and 602 is close to a diagonal line, which is the ideal case. Median filtering and line fitting can be used to remove outliers for better performance. Quantitatively, 90.3% of the CT test slices and 91.1% of the MR test slices are predicted with an error of less than 0.05.

The body part recognition results using the CNN trained by fine-tuning a pre-trained P-CNN are also compared with other methods. Training/fine-tuning was performed on both CT and MR volumes with three different sizes of training set: 100%, 50%, and 25% of all training images. Then the body part recognition was tested on unseen CT and MR data with a fixed number of images. The body part recognition results were compared to results of several other baseline methods, including: 1) SIFT+bag-of-word+support vector regression; and 2) SURF+bag-of-word+support vector regression. Table 1 shows a comparison of body part recognition methods. As shown in Table 1, pre-training a P-CNN on slice ordering and fine-tuning achieves the smallest Euclidean loss in most cases.

TABLE 1

Euclidean loss of body part recognition on CT and MR data

| Training set size | CT data | | | MR data | | |
| --- | --- | --- | --- | --- | --- | --- |
| | 100% | 50% | 25% | 100% | 50% | 25% |
| SIFT + BOW + SVR | — | — | 0.0244 | 0.0096 | 0.0104 | 0.0130 |
| SURF + BOW + SVR | 0.0096 | 0.0194 | 0.0412 | 0.0108 | 0.0125 | 0.0134 |
| AlexNet from scratch | 0.00111 | 0.00655 | 0.02222 | 0.00046 | 0.00086 | 0.00209 |
| Finetuning-AlexNet | 0.00193 | 0.00867 | 0.02431 | 0.00061 | 0.00112 | 0.00242 |
| Ours-P-CNN | 0.00137 | 0.00620 | 0.01973 | 0.00035 | 0.00073 | 0.00185 |

Table 2 shows the average recognition error in millimeters for various training methods. With an average body height of 1809 mm and 1740 mm in the CT and MR test set, respectively, the CNN trained by fine-tuning a pre-trained P-CNN achieved a low recognition error of 25.3 mm and 20.1 mm, or 1.40% and 1.16%, respectively. A typical gap between neighboring transversal slices is 5 mm for CT and 10 mm for MR. Accordingly, the body part recognition error using a CNN trained by fine-tuning a P-CNN is only a few slices. These results demonstrate that even though the P-CNN is pre-trained only on CT data, it can generalize well to body part recognition on both CT and MR images. Notice that a smaller recognition error was achieved on MR than on CT. This can be explained by the comparison experiments, which have smaller error rates on MR, indicating that in this case body part recognition on MR images is indeed an easier problem. This also shows that by fine-tuning, the method could be well adapted to a new problem other than body part recognition. It can also be observed that the test performance is greatly affected by training set size, which is natural since more training data covers more cases with more information. The result demonstrate overfitting signs after 10-200 epochs: validation error begins to increase while training error keeps decreasing. However, the present inventors have observed that training from scratch overfits most easily and the models tend to overfit earlier with less training data. Without any human annotation, the pre-trained P-CNN outperforms the pre-trained AlexNet by a large margin, even though the training set for training the P-CNN for slice ordering is significantly smaller than the ImageNet ILSVRC 2012 training set used for training AlexNet (~89K v 1.3M). Surprisingly, fine-tuning from the pre-training AlexNet performs not as well as training from scratch for this regression task. This indicates that the dissimilarity between natural images may pose a considerable obstacle on the body part recognition task.

TABLE 2

Recognition error (in mm) of body part recognition on CT and MR data

| Training set size | CT data | | | MR data | | |
| --- | --- | --- | --- | --- | --- | --- |
| | 100% | 50% | 25% | 100% | 50% | 25% |
| AlexNet from scratch | 21.6 | 86.1 | 288.3 | 20.9 | 24.4 | 41.8 |
| Finetuning-AlexNet | 72.0 | 163.3 | 272.5 | 56.4 | 50.3 | 76.5 |
| Ours-P-CNN | 25.3 | 81.2 | 229.8 | 20.1 | 24.3 | 34.9 |

Embodiments of the present invention provide an unsupervised approach for deep representation learning for slice based body part recognition. Using only context information in 3D medical imaging volumes, the problem of slice ordering can be effectively using a P-CNN. The pre-trained P-CNN for slice ordering can be transferred and fine-tuned to train a CNN for body part recognition. In other possible embodiments, the pre-trained P-CNN may also be transferred and fine-tuned for other medical image analysis problems as well.

Figure 7:
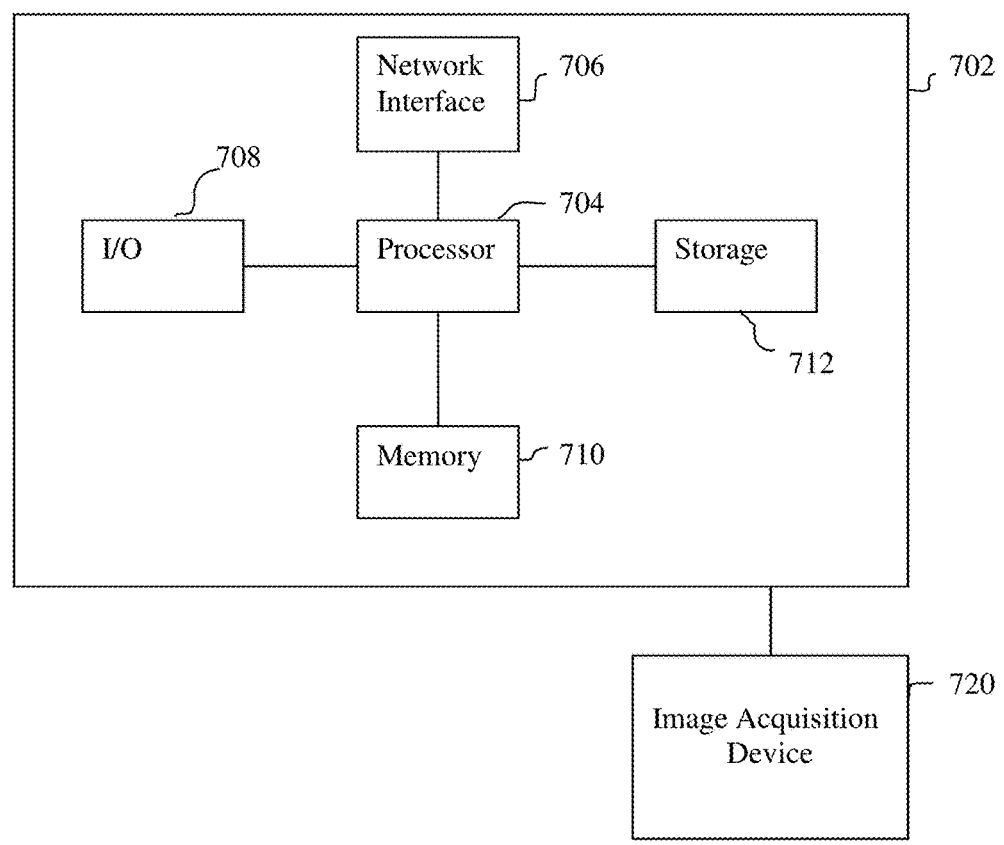
FIG. 7 is a high-level block diagram of a computer capable of implementing the present invention.

The above-described methods for fine-grained body part recognition in medical imaging data and for training a CNN for fine-grained body part recognition may be implemented on a computer using well-known computer processors, memory units, storage devices, computer software, and other components. A high-level block diagram of such a computer is illustrated in FIG. 7. Computer 702 contains a processor 704, which controls the overall operation of the computer 702 by executing computer program instructions which define such operation. The computer program instructions may be stored in a storage device 712 (e.g., magnetic disk) and loaded into memory 710 when execution of the computer program instructions is desired. Thus, the steps of the methods of FIGS. 1 and 5 may be defined by the computer program instructions stored in the memory 710 and/or storage 712 and controlled by the processor 704 executing the computer program instructions. An image acquisition device 720, such as a CT scanner or MRI scanner, can be connected to the computer 702 to input image data to the computer 702. It is possible to implement the image acquisition device 720 and the computer 702 as one device. It is also possible that the image acquisition device 720 and the computer 702 communicate wirelessly through a network. In a possible embodiment, the computer 702 can be located remotely with respect to the image acquisition device 720 and the method steps described herein can be performed as part of a server or cloud based service. In this case, the method steps may be performed on a single computer or distributed between multiple networked computers. The computer 702 also includes one or more network interfaces 706 for communicating with other devices via a network. The computer 702 also includes other input/output devices 708 that enable user interaction with the computer 1002 (e.g., display, keyboard, mouse, speakers, buttons, etc.). Such input/output devices 708 may be used in conjunction with a set of computer programs as an annotation tool to annotate volumes received from the image acquisition device 720. One skilled in the art will recognize that an implementation of an actual computer could contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for deep learning based fine-grained body part recognition in medical imaging data, comprising:
    training a paired convolutional neural network (P-CNN) for slice ordering based on unlabeled training medical image volumes; wherein training the P-CNN for slice ordering based on the unlabeled training medical image volumes comprises:
        randomly sampling transversal slice pairs from the unlabeled training medical image volumes, wherein each transversal slice pair is randomly sampled from the same training volume, and
        training the P-CNN to predict a relative order of a pair of transversal slices of a medical imaging volume based on the randomly sampled transversal slice pairs, wherein the P-CNN includes two identical sub-networks for a first plurality of layers, each to extract feature from a respective slice of the pair of transversal slices, and global final layers to fuse outputs of the sub-networks and calculate a binary classification result regarding the relative order of the pair of transversal slices; and
    training a convolutional neural network (CNN) for fine-grained body part recognition by fine-tuning learned weights of the trained P-CNN for slice ordering.

2. The method of claim 1, wherein the CNN for fine-grained body part recognition includes a first plurality of layers for extracting features from an input transversal slice of a medical imaging volume and a set of final regression layers for calculating a normalized height score for the input transversal slice corresponding to a normalized height of the input transversal slice in a human body.

3. The method of claim 2, wherein training a convolutional neural network (CNN) for fine-grained body part recognition by fine-tuning learned weights of the trained P-CNN for slice ordering comprises:
    initializing weights of the first plurality of layers of the CNN for fine-grained body part recognition using learned weights of the first plurality of layers of one of the sub-networks in the trained P-CNN for slice ordering;
    randomly initializing weights of the final regression layers of the CNN; and
    fine-tuning the weights of all of the layers of the CNN based on annotated training medical image volumes with a reduced learning rate of the first plurality of layers.

4. A method for deep learning based fine-grained body part recognition in medical imaging data, comprising:
    training a paired convolutional neural network (P-CNN) for slice ordering based on unlabeled training medical image volumes; and
    training a convolutional neural network (CNN) for fine-grained body part recognition by fine-tuning learned weights of the trained P-CNN for slice ordering, wherein training the CNN for fine-grained body part recognition by fine-tuning the learned weights of the trained P-CNN for slice ordering comprises:
        generating a normalized body height model based on locations of a set of anatomical landmarks in at least a subset of annotated medical imaging volumes,
        calculating normalized height scores for transversal slices of the annotated medical imaging volumes based on the normalized body height model, and
        training the CNN for fine-grained body part recognition by fine-tuning the learned weights of the trained P-CNN for slice ordering based on the transversal slices of the annotated medical imaging volumes and the normalized height scores calculated for the transversal slices.

5. The method of claim 4, wherein the normalized body height model normalizes a height of a human body between values of 0 and 1 and includes average normalized height values for each of the set of anatomical landmarks in at least the subset of the annotated medical imaging volumes.

6. The method of claim 5, wherein calculating normalized height scores for transversal slices of the annotated medical imaging volumes based on the normalized body height model comprises:
    for each of the annotated medical imaging volumes:
        assigning a respective normalized height value for the location of each of the set of anatomical landmarks as the average normalized height value of that anatomical landmark in the normalized body height model; and
        interpolating between the anatomical landmarks in the set of anatomical landmarks to determine normalized height values for the transversal slices between the anatomical landmark locations.

7. The method of claim 6, wherein the set of anatomical landmarks comprises top of a head, neck, lung, spine, knee, and foot landmarks.

8. An apparatus for deep learning based fine-grained body part recognition in medical imaging data, comprising:
    means for training a paired convolutional neural network (P-CNN) for slice ordering based on unlabeled training medical image volumes, wherein the means for training the P-CNN for slice ordering based on the unlabeled training medical image volumes comprises:

means for randomly sampling transversal slice pairs from the unlabeled training medical image volumes, wherein each transversal slice pair is randomly sampled from the same training volume, and means for training the P-CNN to predict a relative order of a pair of transversal slices of a medical imaging volume based on the randomly sampled transversal slice pairs, wherein the P-CNN includes two identical sub-networks for a first plurality of layers, each to extract feature from a respective slice of the pair of transversal slices, and global final layers to fuse outputs of the sub-networks and calculate a binary classification result regarding the relative order of the pair of transversal slices; and means for training a convolutional neural network (CNN) for fine-grained body part recognition by fine-tuning learned weights of the trained P-CNN for slice ordering.

9. The apparatus of claim 8, wherein the CNN for fine-grained body part recognition includes a first plurality of layers for extracting features from an input transversal slice of a medical imaging volume and a set of final regression layers for calculating a normalized height score for the input transversal slice corresponding to a normalized height of the input transversal slice in a human body.

10. The apparatus of claim 9, wherein the means for training a convolutional neural network (CNN) for fine-grained body part recognition by fine-tuning learned weights of the trained P-CNN for slice ordering comprises:

means for initializing weights of the first plurality of layers of the CNN for fine-grained body part recognition using learned weights of the first plurality of layers of one of the sub-networks in the trained P-CNN for slice ordering;

means for randomly initializing weights of the final regression layers of the CNN; and means for fine-tuning the weights of all of the layers of the CNN based on annotated training medical image volumes with a reduced learning rate of the first plurality of layers.

11. An apparatus for deep learning based fine-grained body part recognition in medical imaging data, comprising:

means for training a paired convolutional neural network (P-CNN) for slice ordering based on unlabeled training medical image volumes; and means for training a convolutional neural network (CNN) for fine-grained body part recognition by fine-tuning learned weights of the trained P-CNN for slice ordering, wherein the means for training the CNN for fine-grained body part recognition by fine-tuning the learned weights of the trained P-CNN for slice ordering comprises:

means for generating a normalized body height model based on locations of a set of anatomical landmarks in at least a subset of annotated medical imaging volumes, means for calculating normalized height scores for transversal slices of the annotated medical imaging volumes based on the normalized body height model, and means for training the CNN for fine-grained body part recognition by fine-tuning the learned weights of the trained P-CNN for slice ordering based on the transversal slices of the annotated medical imaging volumes and the normalized height scores calculated for the transversal slices.

12. The apparatus of claim 11, wherein the normalized body height model normalizes a height of a human body between values of 0 and 1 and includes average normalized height values for each of the set of anatomical landmarks in at least the subset of the annotated medical imaging volumes.

13. The apparatus of claim 12, wherein the means for calculating normalized height scores for transversal slices of the annotated medical imaging volumes based on the normalized body height model comprises:

means for assigning a respective normalized height value for the location of each of the set of anatomical landmarks in each of the annotated medical imaging volumes as the average normalized height value of that anatomical landmark in the normalized body height model; and means for interpolating between the anatomical landmarks in the set of anatomical landmarks to determine normalized height values for the transversal slices between the anatomical landmark locations in each of the annotated medical imaging volumes.

14. A non-transitory computer readable medium storing computer program instructions for deep learning based fine-grained body part recognition in medical imaging data, the computer program instructions when executed on a processor cause the processor to perform operations comprising:

training a paired convolutional neural network (P-CNN) for slice ordering based on unlabeled training medical image volumes, wherein training the P-CNN for slice ordering based on the unlabeled training medical image volumes comprises:

randomly sampling transversal slice pairs from the unlabeled training medical image volumes, wherein each transversal slice pair is randomly sampled from the same training volume, and training the P-CNN to predict a relative order of a pair of transversal slices of a medical imaging volume based on the randomly sampled transversal slice pairs, wherein the P-CNN includes two identical sub-networks for a first plurality of layers, each to extract feature from a respective slice of the pair of transversal slices, and global final layers to fuse outputs of the sub-networks and calculate a binary classification result regarding the relative order of the pair of transversal slices; and training a convolutional neural network (CNN) for fine-grained body part recognition by fine-tuning learned weights of the trained P-CNN for slice ordering.

15. The non-transitory computer readable medium of claim 14, wherein the CNN for fine-grained body part recognition includes a first plurality of layers for extracting features from an input transversal slice of a medical imaging volume and a set of final regression layers for calculating a normalized height score for the input transversal slice corresponding to a normalized height of the input transversal slice in a human body.

16. The non-transitory computer readable medium of claim 15, wherein training a convolutional neural network (CNN) for fine-grained body part recognition by fine-tuning learned weights of the trained P-CNN for slice ordering comprises:

initializing weights of the first plurality of layers of the CNN for fine-grained body part recognition using learned weights of the first plurality of layers of one of the sub-networks in the trained P-CNN for slice ordering;

randomly initializing weights of the final regression layers of the CNN; and fine-tuning the weights of all of the layers of the CNN based on annotated training medical image volumes with a reduced learning rate of the first plurality of layers.

17. A non-transitory computer readable medium storing computer program instructions for deep learning based fine-grained body part recognition in medical imaging data, the computer program instructions when executed on a processor cause the processor to perform operations comprising:

training a paired convolutional neural network (P-CNN) for slice ordering based on unlabeled training medical image volumes; and training a convolutional neural network (CNN) for fine-grained body part recognition by fine-tuning learned weights of the trained P-CNN for slice ordering, wherein training the CNN for fine-grained body part recognition by fine-tuning the learned weights of the trained P-CNN for slice ordering comprises:

generating a normalized body height model based on locations of a set of anatomical landmarks in at least a subset of annotated medical imaging volumes, calculating normalized height scores for transversal slices of the annotated medical imaging volumes based on the normalized body height model, and training the CNN for fine-grained body part recognition by fine-tuning the learned weights of the trained P-CNN for slice ordering based on the transversal slices of the annotated medical imaging volumes and the normalized height scores calculated for the transversal slices.

18. The non-transitory computer readable medium of claim 17, wherein the normalized body height model normalizes a height of a human body between values of 0 and 1 and includes average normalized height values for each of the set of anatomical landmarks in at least the subset of the annotated medical imaging volumes.

19. The non-transitory computer readable medium of claim 18, wherein calculating normalized height scores for transversal slices of the annotated medical imaging volumes based on the normalized body height model comprises:

for each of the annotated medical imaging volumes:

assigning a respective normalized height value for the location of each of the set of anatomical landmarks as the average normalized height value of that anatomical landmark in the normalized body height model; and interpolating between the anatomical landmarks in the set of anatomical landmarks to determine normalized height values for the transversal slices between the anatomical landmark locations.

* * * * *